United States Patent Office 3,421,291
Patented Jan. 14, 1969

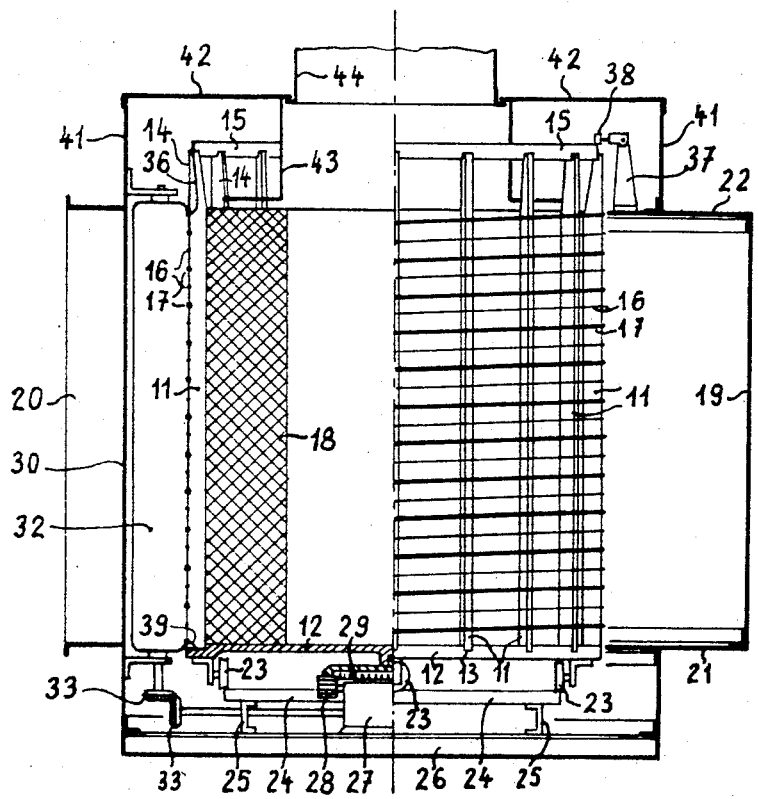
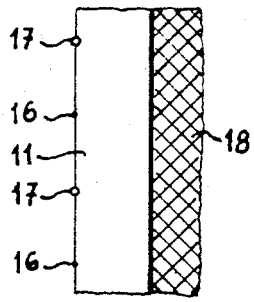
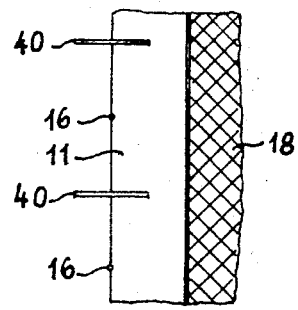
Fig. 2
Fig. 3
Fig. 4

3,421,291
ELECTROSTATIC DUST SEPARATOR
Gregori Messen-Jaschin, Sarnen, Switzerland, assignor to G. A. Messen-Jaschin, Sarnen, Switzerland, a corporation of Switzerland
Filed Jan. 10, 1966, Ser. No. 519,738
Claims priority, application Switzerland, Jan. 18, 1965, 748/65
U.S. Cl. 55—114
Int. Cl. B03c 3/00
8 Claims

ABSTRACT OF THE DISCLOSURE

An electrostatic dust separator having a spiral-shaped housing having an outer intake duct and an axial discharge duct. A hollow cylindrical separation electrode system pervious to gas and a cylindrical ionization electrode system are mounted coaxially in the housing. The ionization electrode system is formed as a rotatable finned block having slender electrodes on its exterior in convolutions spaced from each other axially of the systems. Brush means mounted adjacent the juncture of the smaller diameter part of the housing and the intake duct engage the ionization electrodes for cleaning the latter.

---

Figure 1:
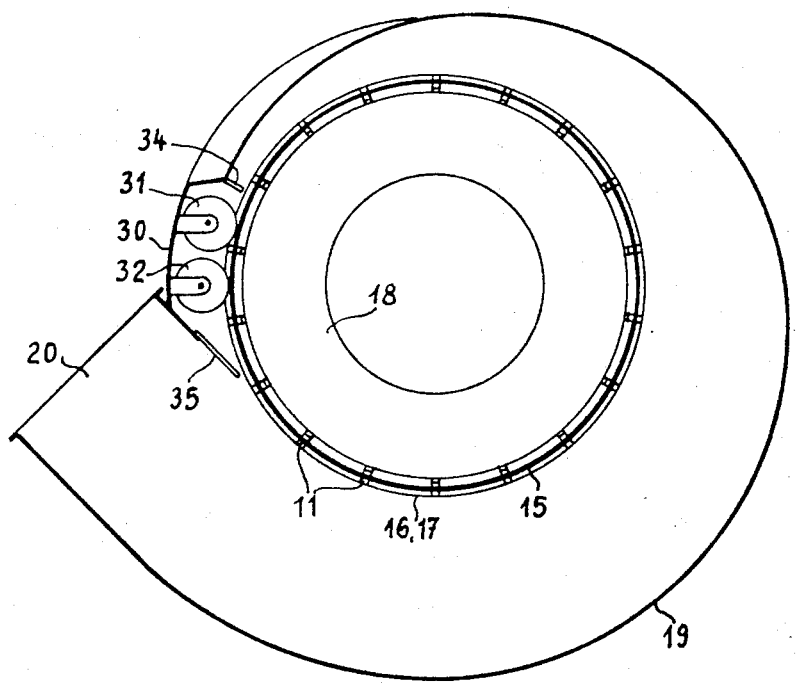

This invention relates to electrostatic dust separators of the kind in which air or gas laden with dust particles is passed through a system which ionizes the particles and causes them to be deposited on a separation electrode, while the air or gas flows out of the system free or substantially free of entrained particles.

Electrostatic dust separators are generally equipped with a high tension ionization electrode and a ground separation electrode. Air dust particles passing through the system are first ionized and subsequently deposited on separation electrodes. Ionization electrodes in conventional dust separators are thin wires, while separation electrodes are metal plates or coiled metal strips. Such metal plates or strips must periodically be cleaned of dust, or alternately, the equipment must be in constant motion and, after removal of separation cells, washed and brushed.

Experience has indicated that such electrostatic dust separators are operationally reliable in purifying cold air or gas, but fail to function properly by permitting passage of dusty gases when air and/or gas is hot. Such electrostatic separators function properly only when gases to be treated are precooled.

Experience has further indicated that such separators fail and do not purify air at room temperatures when dust particles in the air are electroconductive, such as consisting of metallic particles. Conventional separation electrodes, such as plates or coil strips, are then useless, due primarily to the difficulties encountered in removing dust following the cleaning of the separation electrodes. In order to remove the dust from the equipment, disposable electrodes have been proposed which would be removed from the equipment along with dust deposits. However, certain difficulties have been encountered in designing a form of disposable electrodes and in balancing them in relation to ionization electrodes, failing thus to achieve a workable and maximum dust separation.

Studies conducted in connection with causes of failures of conventional dust separators have indicated that hot gases ionize per se, and in both polarities. Such gas ionization results in a commensurate dust ionization. Dust particles ionizing in both polarities and passing through a dust separator are deposited only in part, i.e., only high tension ionization electrodes of dust particles with like polarity are deposited on separation electrodes, while dust particles with opposite polarity are deposited on the ionization electrodes. A unipolar ionization of dust is thus precluded. As a result, the dust is not deposited and passes freely through the separator.

A minimum inherent ionization of metallic dust particles must be assumed as given at room temperatures. Dust particles settling on the thin ionization wires quickly enlarge the exposure area of the wires, which in turn results in a decreased field intensity in the ionization zone and finally in a complete loss of ionization. Dust then passes freely through the separator.

An object of the present invention is to provide an electrostatic dust separator which largely overcomes the shortcomings and difficulties of electrostatic dust separators previously known.

More particularly, an object of the invention is to provide an electrostatic dust separator with slender, e.g., wire and/or strip ionization electrodes as well as a separation electrode system, characterized by a separation electrode system designed as a circular cylinder system and by ionization electrodes mounted on the outside of an external coaxial cylinder structure the input of processed gas being radial into the ionization electrode cylinder and the separation electrode cylinder, while the output is axial, at least the ionization electrode cylinder rotating slowly around its axis, and at least one brush being provided to clean ionization electrodes in the longitudinal direction.

An effective and practical design can be obtained by providing a rotating finned block in a spiral cylinder housing having ionization electrodes on the outside and separation electrodes on the inside, the finned block preferably consisting of connecting bars made of insulating material, and being positioned between the cylinder outside panel joints, double cross-wired with high tension live slender conductors and the ground slender wire and/or metal strip at equal intervals serving as ionization electrodes.

According to the invention, provision is made for the use of a disposable separation electrode, consisting for example of a metallic wool cylinder. Due to the cylindrical form and the radial input of gas into the system, particularly when the separation electrode cylinder rotates with the ionization electrode cylinder, the separation electrode cylinder is evenly filled with gas. The metallic wool cylinder has the advantage of possessing a relatively large surface area under simultaneous low stream resistance, since the separation cylinder wall cannot be built of thick material for physical reasons. In addition, metallic wool, which can be fine or coarse as desired, serves as a mechanical filter. This is an asset with regard to accidental loss of electric power, since the separator remains effective at least to a smaller extent.

The invention is illustrated in the accompanying drawings, in which:

FIGURE 1 is a plan view of an electrostatic dust separator embodying the invention;
FIGURE 2 is a view partly in elevation and partly in vertical section;
FIGURE 3 is an enlarged section from FIGURE 2; and
FIGURE 4 is a view similar to FIGURE 3 but showing a modification.

As shown in FIGURES 1 and 2, vertical bar guides 11, made of insulation material, form a pervious cylindrical finned block. The guides 11 are anchored at their lower ends on the periphery of circular plate 12, within a groove 13, and carry at their upper ends 14 a circular metallic ring 15. The finned block is a cylindrical rotation block whose guides 11 are spaced circumferentially. Wire ionization electrodes 16, 17, are wired on the finned block, in a manner to be described. A separation electrode system 18 is within the finned block. The system 18 is a pervious rotary body, in effect a thick-wall pipe, also to be described. Ionization electrodes 16 and 17 are positioned cylindrically coaxially with the separation electrode system 18. The entire system, revolving around its axis, is housed in a spiral cylinder or housing 19. Housing 19 has an intake sleeve or duct 20, a floor 21, and a ceiling 22. Plate 12 is supported by four casters 23 running in circular rail 24. Rail 24 rests on bars 25, 26, which also provide the base for an electric motor in housing 27. The motor supplies the power to rotate plate 12 with ionizer 16, 17 and separator 18 slowly. Transmission of the power to the plate 12 occurs via pinion drive 28 and cog-wheel 29. As shown in the drawings, the hollow cylindrical separation electrode system 18 is mounted within the spiral shaped housing 19 with its axis parallel to that of the housing; and the cylindrical ionization electrode system 11, 16, 17 is mounted within the housing coaxially with the separator system. The convolutions of the electrodes 16 and 17 are spaced from each other axially of the electrode systems.

Two rotary cylindrical brushes 31, 32, of desired coarseness, are mounted on housing wall 30. Rotary power to the brushes is supplied from electric motor 27 via bevel gear drive 33, in the same sense as the rotary power supplied to plate 12, but the rotation of the brushes is considerably faster. Brushes 31, 32 are of the same length as the electrode cylinders. As shown in FIGURE 2, the brushes 31, 32 are mounted adjacent to the juncture of the smaller diameter part of the spiral shaped housing 19 and the intake duct 20.

Air to be treated enters the system at sleeve 20, proceeds in a generally radial manner through the gas-pervious ionization electrode cylinder 11, 16, 17 and through the gas-pervious separation electrode cylinder 18, leaving the latter upward-axially through the axial space. Dust is ionized on ionization wires 16, 17 and deposited in separation electrode cylinder 18. Should dust settle on ionization electrodes 16, 17 as a result of self-ionization by heat or in the case of metallic particles, it is wiped off by rotating brushes 31, 32. Since the brushes are situated between the end of the spiral housing and the intake sleeve, the air stream is not obstructed by the electrode cylinder. Ionization wires 16, 17 at the beginning of the spiral housing, where the quantity contained in the air is the largest, are thus always clean, free of dust particles. The brushes 31, 32 are preferably housed in a chamber separated from the air tunnel of the spiral housing 19 by insulation walls 34, 35. Radial stream flow of the air through the electrode cylinder 11 can be improved, if necessary, by introducing vane devices into the spiral housing.

The design of the ionization electrode system is such that high tension wires 16 of a smaller diameter alternate with ground wires 17 of a larger diameter on the exterior of the finned block, the wires 16, 17 being placed in grooves of the connecting bars 11. The wires can form closed rings in horizontal planes, with alternate electrical connection, or a thinner wire can be doubled with a thicker wire as shown at the right of FIGURE 2. Thin wire 16 is connected at the top in FIGURE 2 by a wire 36 with the ring 15. The ring 15 is the rail for contact roller 38 supported by insulator 37. Contact roller 38 is circuit-connected with a high tension generator, not shown. Thick wire 17 is connected at the bottom in FIGURE 2 by wire 39 with the plate 12 which is ground connected via casters 23 and circular rail 24. Thin wires 16 are positioned at an equal distance from thick wires 17 and from the separation electrode system 18, as shown in the enlarged FIGURE 3. The intensity of the electric field is so great that corona discharge occurs for purposes of ionization.

As shown in FIGURE 4, thin metal strips 40 can be used in place of thick wires 17, with milled edges locked in the grooves of connecting bars 11. Alternately, horizontal rings can be made of metal strips provided with radial grooves and receiving the bars. The profile of the strips can be flat or slightly arched. Such ground connected strips produce a more favorable field distribution of corona discharge and thereby a better ionization. In addition, they also permit a stronger separation than a round wire. However, they can be continuously cleaned only when rotating longitudinally to the brushes.

The separation electrode system 18 stands on rotating plate 12 and is supported by the finned block comprising the bars 11. The cylindrical body 18 which forms the separation electrode system is, in effect, a thick-walled pipe made of air-porous, electrically conductive material, such as metal wool. The wool can be of wiry or hairy material of, e.g., aluminum or some other metal, or it can be porous or cellular material, or some other conductive material. Electrodes made of such material cannot be cleaned and are discarded after use. Electrode 18 is replaced with another when filled with deposited dust. Removal of the electrode is accomplished through lifting it toward the top of the finned block. A removable cover 42 is provided for this purpose on panel 41 of ceiling 22. Cover 42 has a collar 43 to prevent flow of contaminated air into a discharge gate, i.e., pipe or duct 44 through which purified air is released. Bars 11 have tapered upper edges 14 to facilitate the replacement of electrode 18.

According to the invention, separation electrode system 18 does not have to rotate with the finned block and ionization electrodes 16, 17. As an example, separation electrode system 18 could hang on collar 43. However, corotation of the separation system works to an advantage, primarily because no free play between electrode 18 and connecting bars 11 is necessary. Instead, electrode 18 can lean against the bars and clearance from ionization electrodes 16, 17, or 16, 40, can be accurately defined. Rotation of the separation system is also helpful in streamlining and distributing the processed air through the electrode.

The wires 16 and 17, and the strips 40 are, in common, slender conductive elements.

The electrostatic dust separator presented in this invention is suitable for separation of metallic dust and for purification of hot gases. A smaller size unit is suitable for living quarters, offices, restaurants, etc.

I claim:

1. In an electrostatic dust separator, a spiral-shaped housing having an outer intake duct and an axial discharge duct; a hollow cylindrical separation electrode system pervious to gas mounted within said housing with its axis parallel to that of the housing; a cylindrical ionization electrode system mounted within said housing coaxially with said separator electrode system and comprising a rotatable finned block having slender ionization electrodes supported on its exterior in convolutions spaced from each other axially of said electrode systems; brush means mounted adjacent the juncture of the smaller diameter part of said spiral-shaped housing and said intake duct and engaging said ionization electrodes; and means for rotating said ionization electrode system.

2. An electrostatic dust separator according to claim 1 in which said separation electrode system is mounted for rotation within said housing, and in which said means for rotating rotates both said systems at the same speed.

3. An electrostatic dust separator according to claim 1 in which said brush means is within said housing.

4. An electrostatic dust separator according to claim 1 in which said brush means is rotatable, further including means for rotating said brush means faster than the rotation of said ionization electrode system.

5. An electrostatic dust separator according to claim 1 in which the separation electrode system is mounted on the inner side of said finned block.

6. An electrostatic dust separator according to claim 5 in which said finned block comprises a plurality of bars of insulating material; and in which the slender electrodes include high tension wires of relatively small diameter and ground wires of relatively large diameter alternately arranged lengthwise of said block at equal intervals.

7. An electrostatic dust separator according to claim 5 in which said ionization electrodes include metallic ground strips and high tension wires positioned alternately with said strips on said finned block.

8. An electrostatic dust separator according to claim 5 in which said separation electrode system comprises a disposable cylinder formed of metallic wool.

References Cited

UNITED STATES PATENTS

| | | | |
|---|---|---|---|
| 1,362,128 | 12/1920 | Moller | 55—114 |
| 1,444,092 | 2/1923 | Anderson et al. | 55—114 |
| 1,456,044 | 5/1923 | Strong | 55—149 |
| 1,947,447 | 2/1934 | Brassert et al. | 55—113 X |
| 2,085,349 | 6/1937 | Wintermute | 55—127 X |
| 2,119,297 | 5/1938 | Scott | 55—14 X |
| 2,244,279 | 6/1941 | White | 55—151 |
| 2,360,595 | 10/1944 | Thompson | 55—127 |
| 2,547,902 | 4/1951 | Burton | 55—121 X |
| 2,579,441 | 12/1951 | Palmer | 55—131 |
| 2,585,138 | 2/1952 | Landgraf | 55—129 |
| 2,593,869 | 4/1952 | Fruth | 55—151 X |
| 2,672,948 | 3/1954 | Penney | 55—129 |
| 2,841,240 | 7/1958 | Wintermute | 55—127 |

FOREIGN PATENTS

| | | |
|---|---|---|
| Ad. 32,128 | 4/1927 | France. |
| 887,040 | 7/1943 | France. |
| 963,621 | 1/1950 | France. |
| 461,555 | 6/1928 | Germany. |
| 533,036 | 9/1931 | Germany. |
| 333,902 | 12/1958 | Switzerland. |

HARRY B. THORNTON, *Primary Examiner.*

D. TALBERT, Jr., *Assistant Examiner.*

U.S. Cl. X.R.

55—121, 127, 131, 149, 151, 154, 400, 525, 290, 295, 459